(12) United States Patent
McClure et al.

(10) Patent No.: US 7,080,868 B2
(45) Date of Patent: Jul. 25, 2006

(54) REAR PILLAR CONSTRUCTION

(75) Inventors: Kerry S. McClure, Dublin, OH (US); Anthony Ordonio, Jr., Dublin, OH (US); Andrew K. Swayne, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/272,355

(22) Filed: Nov. 10, 2005

(65) Prior Publication Data

US 2006/0108835 A1 May 25, 2006

Related U.S. Application Data

(60) Provisional application No. 60/627,415, filed on Nov. 12, 2004.

(51) Int. Cl.
*B62D 33/03* (2006.01)

(52) U.S. Cl. .................. 296/50; 296/57.1; 296/193.06; 296/146.9; 296/146.11; 296/146.8; 296/183.1

(58) Field of Classification Search ........... 296/193.06, 296/202, 30, 50, 51, 57.1, 146.9, 146.11, 296/146.12, 146.8, 37.6, 183.1, 184.1, 203, 296/205, 203.04

See application file for complete search history.

(56) References Cited

U.S. PATENT DOCUMENTS

| | | | |
|---|---|---|---|
| 4,076,301 A * | 2/1978 | Gergoe .................. 296/50 |
| 4,143,904 A * | 3/1979 | Cooper et al. ............ 296/57.1 |
| 4,379,545 A | 4/1983 | Gray et al. |
| 4,729,156 A | 3/1988 | Norris, Jr. et al. |
| 5,228,742 A | 7/1993 | Johnson et al. |
| 5,324,092 A | 6/1994 | Burg |
| 5,624,150 A | 4/1997 | Venier |
| 5,660,427 A | 8/1997 | Freeman et al. |
| 5,729,463 A | 3/1998 | Koenig et al. |
| 5,855,407 A | 1/1999 | Fukuda |
| 6,024,396 A | 2/2000 | Doshi |
| 6,129,410 A * | 10/2000 | Kosaraju et al. ....... 296/146.11 |
| 6,196,617 B1 * | 3/2001 | Beck ..................... 296/146.11 |
| 6,206,459 B1 | 3/2001 | Kim |
| 6,254,174 B1 | 7/2001 | Wee |
| 6,267,437 B1 | 7/2001 | Morsch et al. |
| 6,282,790 B1 * | 9/2001 | Jaekel et al. ............... 296/205 |
| 6,328,366 B1 | 12/2001 | Foster et al. |
| 6,367,863 B1 * | 4/2002 | Cho ..................... 296/146.11 |
| 6,648,400 B1 | 11/2003 | Takahashi et al. |
| 6,648,401 B1 | 11/2003 | Behnke et al. |
| 6,698,821 B1 * | 3/2004 | Racz ........................ 296/202 |
| 6,805,393 B1 * | 10/2004 | Stevenson et al. ........... 296/50 |
| 6,969,551 B1 * | 11/2005 | Richardson et al. ... 296/187.03 |
| 2001/0002760 A1 * | 6/2001 | Gabbianelli et al. ........ 296/205 |
| 2005/0057070 A1 * | 3/2005 | Seo ...................... 296/146.11 |
| 2005/0242620 A1 * | 11/2005 | McNulty et al. .......... 296/183.1 |
| 2006/0001288 A1 * | 1/2006 | Thiele et al. ................. 296/50 |

* cited by examiner

*Primary Examiner*—Jason Morrow
(74) *Attorney, Agent, or Firm*—Fay, Sharpe, Fagan, Minnich & McKee, LLP

(57) ABSTRACT

A rear pillar structure of a vehicle frame is provided for supporting a dual mode tailgate including a pillar member having a first leg and a second leg. The first leg extends generally vertically along a side wall of the vehicle frame which partially defines a load carrying bed. The second leg extends along a cross member connecting a pair of frame rails of the vehicle frame. A support member is mounted inside the first leg for reinforcing the first leg at a location at which the dual mode tailgate connects to the pillar.

24 Claims, 5 Drawing Sheets

REAR PILLAR CONSTRUCTION

This application claims priority of Provisional Patent Application Ser. No. 60/627,415, filed Nov. 12, 2004, entitled "Rear Pillar Construction".

BACKGROUND

The present disclosure relates to a vehicle frame and, more particularly, a rear pillar structure of a vehicle frame to which a tailgate is mounted. In one embodiment, the rear pillar has a dual mode hinge mounted thereto for supporting an associated dual mode tailgate and enabling the tailgate to selectively pivot to a fold-down position and a swing-open position. The rear pillar structure will be described with particular reference to this embodiment; however, it is to be appreciated that the rear pillar structure could relate to other similar environments and applications.

BRIEF DESCRIPTION

When a tailgate door or other closure is provided in a rear portion of a motor vehicle body, the following arrangement is conventionally employed. Namely, hinge reinforcing members (i.e., reinforcing members for attaching hinges thereto) are provided on a rear roof rail or rear floor rail, and hinges for the tailgate are attached to the hinge reinforcing members. Typically, the hinges and hinge reinforcing members are provided in pairs such that they work in unison and share the load of an associated tailgate mounted thereto.

In the above-described conventional arrangements, the rear rail is only partially reinforced by the reinforcing members at a portion in which the hinges are mounted. In order to improve the supporting rigidity of the rear rail, the rigidity of the rear rail itself is typically increased. To effect this, the plate thicknesses of an inner member and an outer member forming the rail are typically increased, resulting in an increase in weight.

In addition, in increasing the rigidity of the motor vehicle body, the connecting or combining strength between the tailgate and the rear rail is often an important factor. Conventionally, the combining strength between the tailgate and the rear rail is improved either by increasing the plate thicknesses of the rear rail and a pillar inner member that is connected to, or combined with, the rear rail or by providing a reinforcing member that is combined to bridge the rear rail and the tailgate. The pillar extends generally vertically between the rear rail and a roof rail. This arrangement has, however, a disadvantage in that the weight increases significantly and/or that the steps of assembling the motor vehicle body increase.

In view of the above-described disadvantages, there is still a need for providing an improved reinforcing structure in which the supporting rigidity of the rear frame rail can be improved. It is particularly desirable for the reinforcing structure, in conjunction with the rear frame rail, to be able to support all of the forces generated by a dual-mode tailgate wherein the tailgate can pivot in two different orientations and can be supported by one dual mode tailgate hinge.

SUMMARY

In accordance with one aspect, a rear pillar structure of a vehicle frame is provided for supporting a dual mode tailgate. More particularly, in accordance with this aspect, the rear pillar structure includes a pillar member having a first leg and a second leg. The first leg extends generally vertically along a side wall of the vehicle frame which partially defines a load carrying bed. The second leg extends along a cross member connecting a pair of frame rails of the vehicle frame. A support member can be mounted inside the first leg for reinforcing the first leg at a location at which the dual mode tailgate connects to the pillar.

In accordance with another aspect, a rear pillar structure is provided for connecting to a vehicle frame including a side wall. More particularly, in accordance with this aspect, the rear pillar structure includes an L-shaped pillar having a first leg and a second leg. The first leg extends along a rear edge of the side wall structure wherein the side wall structure forms part of a load carrying bed. The second leg extends along a portion of a cross member of the vehicle frame wherein the cross member extends between a pair of frame rails of the vehicle frame. A support member can be mounted inside the first leg wherein the support member and the first leg include a plurality of aligned apertures for mounting a tailgate hinge to the pillar.

In accordance with yet another aspect, a rear pillar structure is provided for connection to a vehicle frame for supporting a tailgate of a load-carrying bed. More particularly, in accordance with this aspect, the rear pillar structure includes a pillar having a first leg, a second leg approximately normal relative to the first leg, and a support member disposed in the first leg. The first leg extends along a rear edge of a side wall of the load carrying bed and is fixedly attached to the side wall and one of a pair of frame rails of the vehicle frame. The second leg extends along a cross member disposed between the pair of frame rails and is fixedly attached to the first leg and the cross member. The support member is fixedly attached to and within the first leg for supporting a hinge of the tailgate.

In accordance with still another aspect, a rear pillar assembly of a vehicle frame is provided. More particularly, in accordance with this aspect, the rear pillar assembly includes a box-shaped pillar member fixedly secured to an adjacent frame rail of the vehicle frame. A cross member extends from the adjacent frame rail to an opposed frame rail of the vehicle frame. The pillar member extends upward from the adjacent frame rail. A support bracket is received in the pillar member to reinforce a portion of the pillar member used to support a pivotally mounted tailgate.

DETAILED DESCRIPTION

Figure 1:
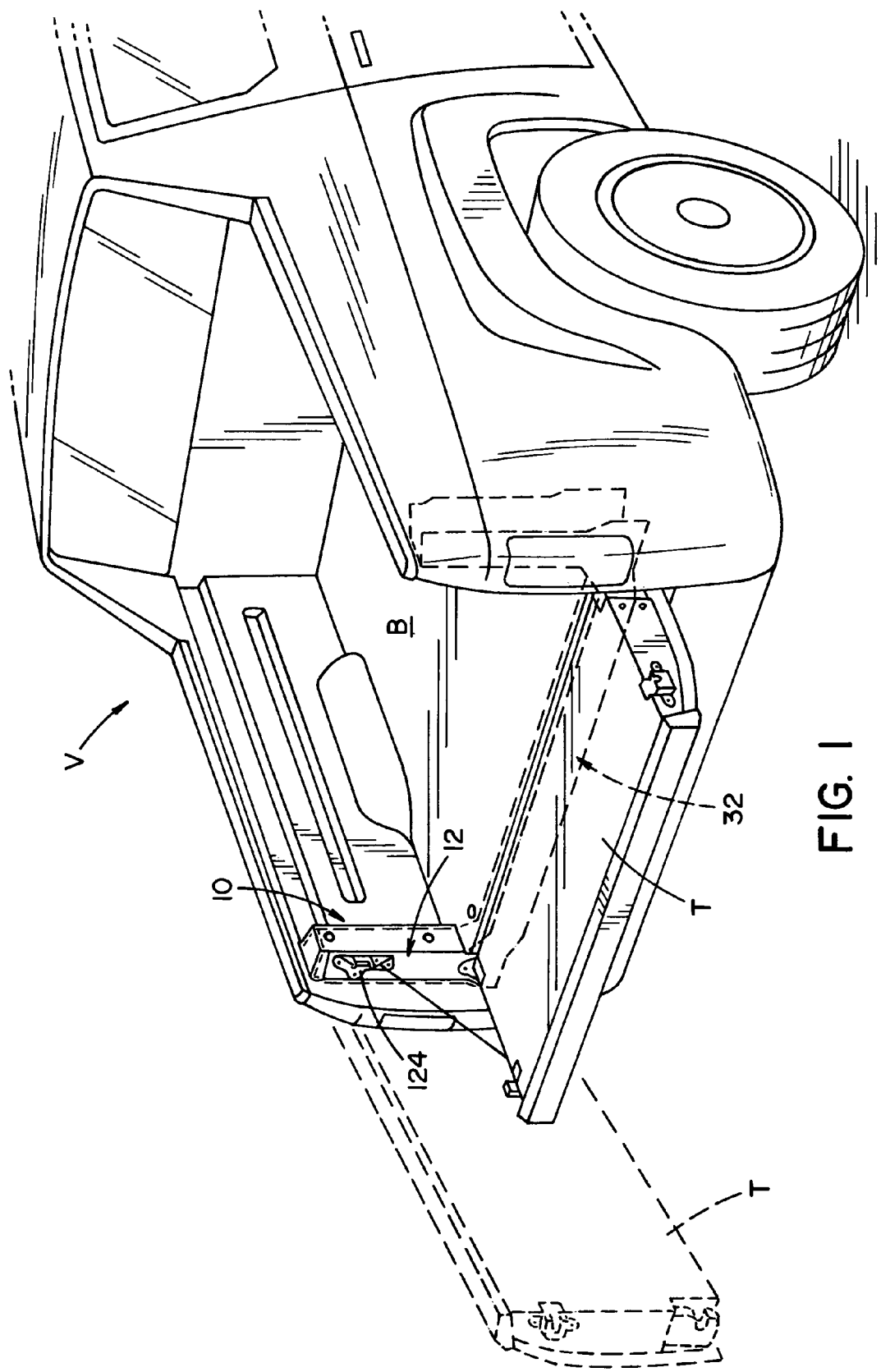
FIG. 1 is a perspective view showing an example of a vehicle having a pillar assembly.

With reference to FIG. 1, a vehicle V is shown therein with a load carrying bed B and a dual mode tailgate T. In the illustrated embodiment, the vehicle V is a sport utility truck (SUT), but it is to be appreciated by those skilled in the art that the vehicle could alternately be any other type of vehicle. A rear pillar assembly or structure 10 is mounted proximal to the rear of the vehicle V and, more particularly, proximal to the rear of the bed B. The rear pillar assembly 10 can support the dual mode tailgate in both the fold-down position and the swing-open position. FIG. 1 displays the pillar assembly 10 mounted in alignment with the left or driver side of the vehicle, but it is to be appreciated that the assembly 10 can be alternatively mounted in alignment with the right or passenger side of the vehicle V.

Figure 2:
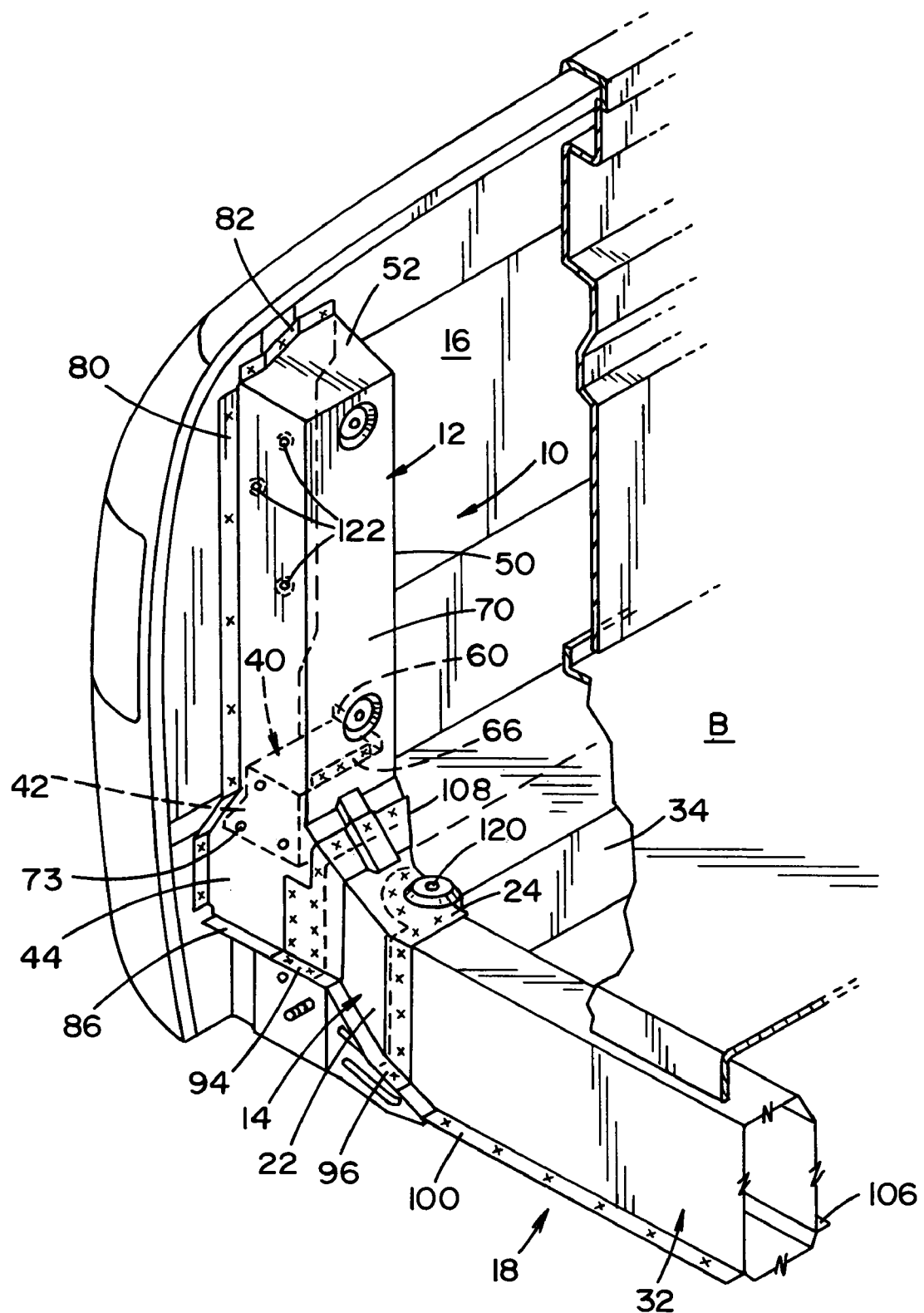
FIG. 2 is a perspective view of the pillar assembly and a portion of the vehicle frame surrounding the pillar assembly (shown with floor and side panel members of the load-carrying bed partially removed)
Figure 6:
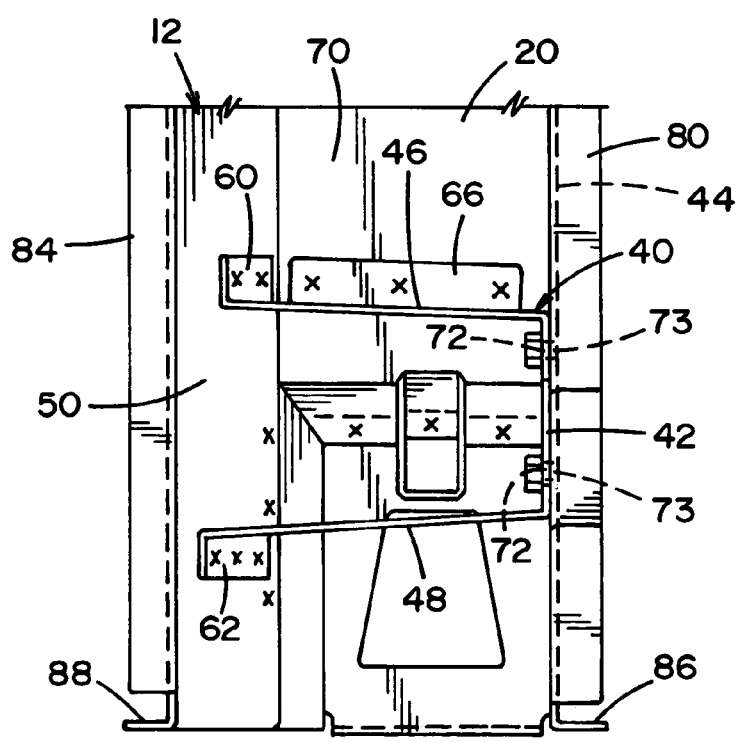

In the illustrated embodiment, with additional reference to FIG. 2, the pillar assembly 10 includes a first leg 12 and a second leg 14. In an assembled arrangement, the pillar assembly 10 can be in a substantially L-shaped or box-shaped configuration. In the illustrated embodiment, the first leg 12 extends generally vertically along a side wall structure 16 of a vehicle frame 18 which partially defines the load carrying bed B. The first leg 12 can be positioned along or proximal to a rear edge of the side wall structure 16. The first leg 12 has a generally U-shaped cross section defining an open end 20 (FIG. 6) positioned adjacent the side wall 16. The frame 18 can be a unibody frame wherein principal body panels of the vehicle V are combined with a platform portion of the frame 18 to form a single, integrated frame assembly. The principal body panels and/or the platform portion can be formed of any suitable material, such as aluminum or steel.

Figure 3:
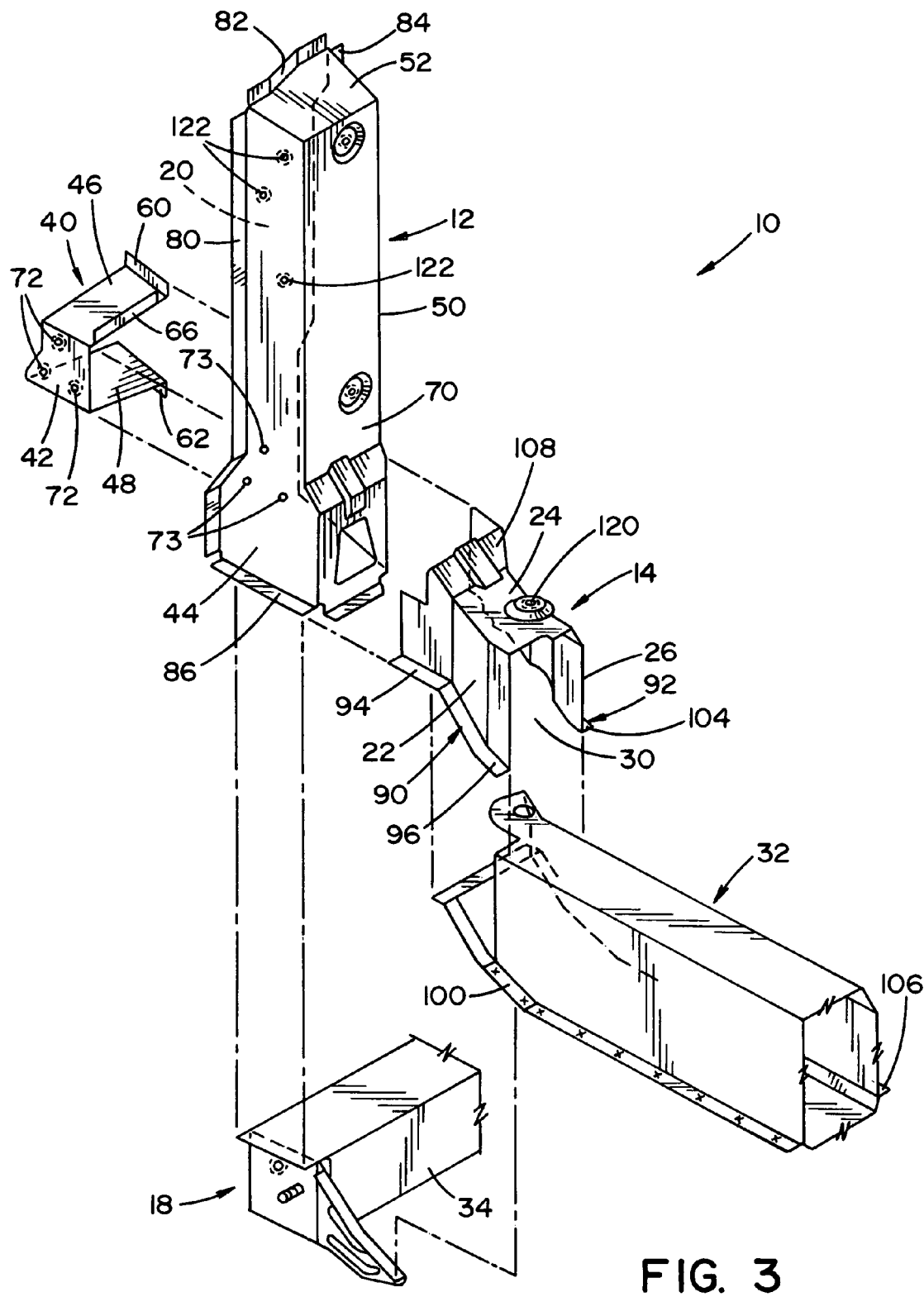
FIG. 3 is an exploded perspective view of the pillar assembly of FIG. 2.
Figure 4:
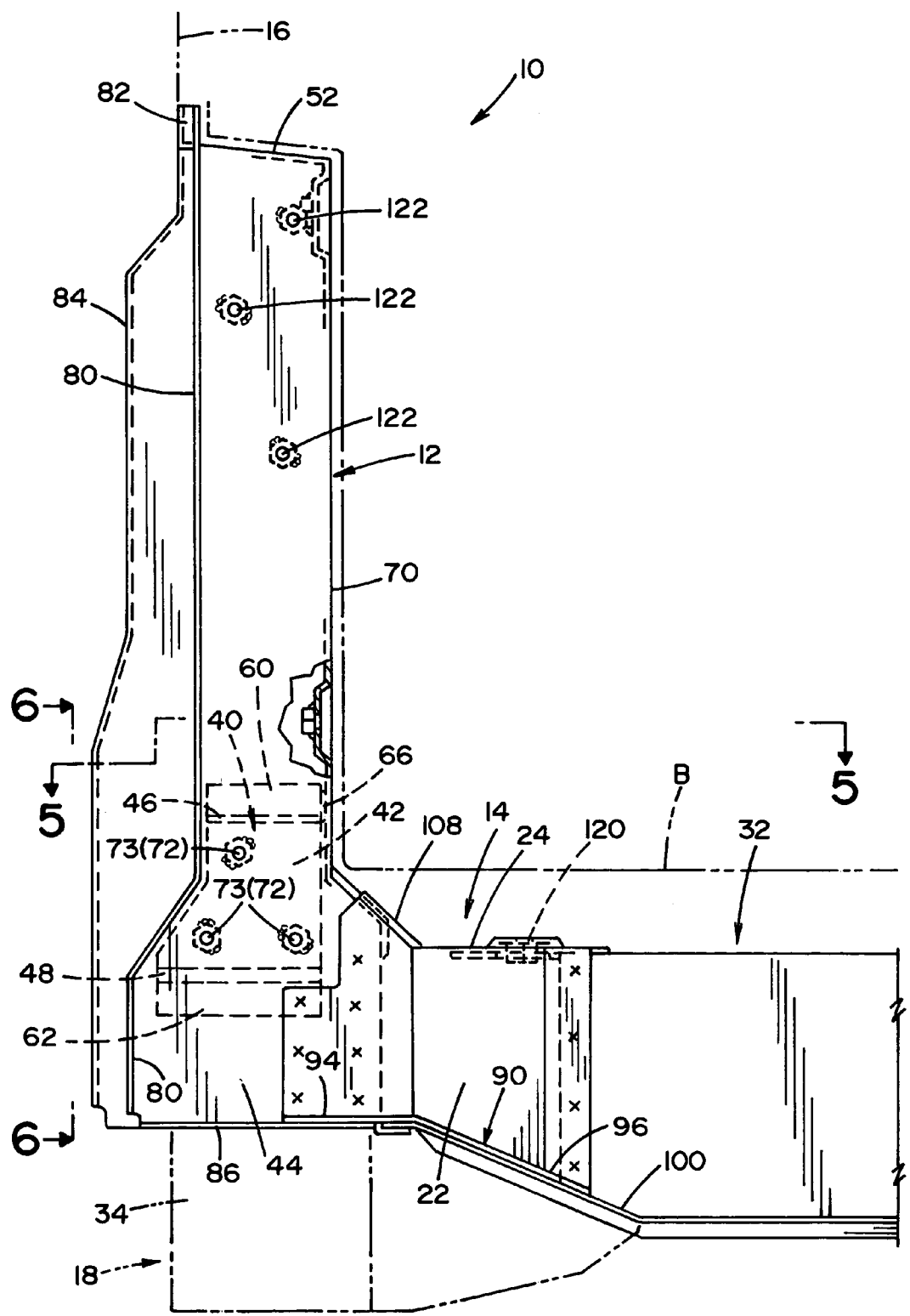
FIG. 4 is a rear elevational view of the pillar assembly of FIG. 2 (shown in an assembled condition)
Figure 5:
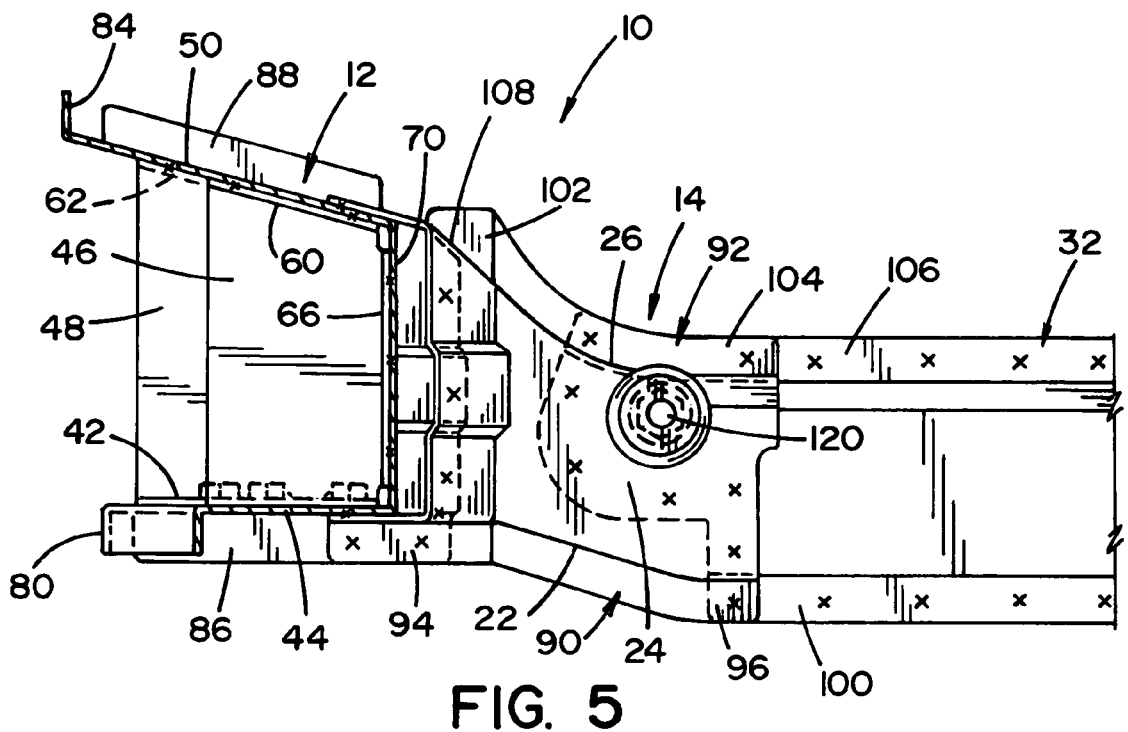
FIG. 5 is a sectional view of the pillar assembly taken along line 5—5 in FIG. 4; and, FIG. 6 is an elevational view of the pillar assembly taken along line 6—6 in FIG. 4.

With further reference to FIG. 3, the second leg or U-shaped bracket 14 of the pillar assembly 10 includes a rear wall 22, a top wall 24, and a front wall 26 defining an open area 30 therebetween. The open area 30 can be positioned, at one end, adjacent the first leg 12 and positioned, at another end, adjacent a cross member 32. In this manner, the second leg 14 can extend along the cross member 32. The cross member 32 connects a pair of frame rails comprising a portion of the vehicle frame 18, only one of which is illustrated in the FIGURES, i.e. rail 34. More particularly, the bracket 14 has a configuration that substantially matches that of the cross member 32 which enables the cross member to be received within the open area 30 in nesting relation with the bracket 14. The bracket 14 is adjacent to and can overlap (mate, nest, etc.) with a portion of the first leg 12.

A support member 40 is provided and can be mounted inside the first leg 12 for reinforcing the first leg 12 at a location at which the dual mode tailgate T hingedly connects to the pillar assembly 10. The support member 40 can be substantially U-shaped in cross section. In the illustrated embodiment, the support member 40 includes a reinforcing portion 42 adjacent a rear wall 44 of the first leg 12 and opposing portions 46, 48 which extend from the reinforcing portion 42 to a front wall 50 of the first leg 12. The support member 40 can be positioned inside the first leg 12 between the rear wall 44 and the front wall 50. The first leg 12 can also include a top wall 52.

Referring now to FIGS. 2–6, assembly and connection of the pillar assembly 10 to the vehicle frame 18 is shown therein. The support member 40 can first be mounted inside the first leg 12 of the pillar assembly 10. Mounting can include any number of means known to one skilled in the art. As shown, one example of mounting the support member 40 includes welding first and second flanges 60, 62 of the opposing portions 46, 48 to the inside surface of the front wall 50 of the first leg 12. Additionally, a third flange 66 can be welded to an inside surface of an intermediate wall 70 of the first leg 12. Welding the flanges 60, 62, 66 to the first leg 12 can include spot welding. Once mounted, the support member 40 and the first leg 12 can include a plurality of aligned apertures 72, 73 for mounting a dual mode tailgate hinge (not illustrated) to the tailgate T.

The first leg 12 can in turn be mounted to one of the pair of frame rails, i.e. rail 34, and to the side wall 16 of the load carrying bed B. The means shown for mounting is spot welding, but other means can be employed. Mounting the first leg 12 to the side wall 16 can include welding a rear side flange 80, a top side flange 82, and a front side flange 84 to the side wall 16. Additionally, the first leg 12 can include a pair of bottom side flanges 86, 88 for mounting to the frame rail 34.

In the assembled position, the second leg 14 can extend generally normal relative to the first leg 12. The second leg 14 can include a rear side flange 90 and a front side flange 92. The rear flange 90 can include first and second portions 94, 96. The first portion 94 of the rear flange 90 can be spot welded to the first leg bottom side flange 86 and the second portion 96 of the rear flange 90 can be spot welded to an associated rear flange 100 of the cross member 32. Similarly, the front flange 92 can include first and second portions 102, 104. The first portion 102 of the front flange 92 can be spot welded to the frame rail 34 and the second portion 104 of the front flange 92 can be spot welded to an associated front flange 106 of the cross member 32. The second leg 14 can include a flared collar 108 which itself can be spot welded proximal to the bottom of the first leg 12.

The second leg 14 and the cross member 32 can include an aligned aperture 120 for receiving a mounting bolt (not illustrated) for securing a floor panel to the base of the load carrying bed B. The first leg 12 can include mounting holes 122 on the rear side 44 for receiving a latch element 124 to secure the tailgate T in the closed orientation.

According to the above-described arrangements, those loads in the downward, rearward and lateral directions which operate on the pillar structure 10 via the dual mode hinge connected to the tailgate T can be received by sharing them among the pillar 10, the side wall 16 of the load carrying bed B, one of the frame rails 34, and the cross member 32 extending between the frame rails.

The exemplary embodiment has been described with reference to the embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A rear pillar structure of a vehicle frame for supporting a dual mode tailgate comprising:
    a pillar member having a first leg and a second leg;
    said first leg extending generally vertically along a side wall of the vehicle frame which partially defines a load carrying bed;
    said second leg extending along a cross member connecting a pair of frame rails of the vehicle frame; and,
    a support member mounted inside said first leg for reinforcing said first leg at a location at which the dual mode tailgate connects to said pillar.

2. The rear pillar structure of claim 1, wherein said second leg is a substantially U-shaped bracket welded to said first leg and nested about said cross member.

3. The rear pillar structure of claim 1, wherein said pillar is secured to an adjacent one of said pair of frame rails.

4. The rear pillar structure of claim 1, wherein said first leg is substantially U-shaped in cross section defining an open end positioned adjacent said side wall.

5. The rear pillar structure of claim 1, wherein said support member is substantially U-shaped in cross section.

6. The rear pillar structure of claim 5, wherein said support member includes a reinforcing portion adjacent a rear wall of said first leg and opposed portions extending from said reinforcing portion to a front wall of said first leg.

7. The rear pillar structure of claim 6, wherein said support member is positioned between said rear wall and said front wall of said first leg.

8. A rear pillar structure for connection to a vehicle frame including a side wall structure, comprising:
   an L-shaped pillar having a first leg and a second leg;
   said first leg extending along a rear edge of the side wall structure, the side wall structure forming part of a load carrying bed;
   said second leg extending along a portion of a cross member of the vehicle frame, the cross member extending between a pair of frame rails of the vehicle frame; and,
   a support member mounted inside said first leg, said support member and said first leg include a plurality of aligned apertures for mounting a tailgate hinge to said pillar.

9. The rear pillar structure of claim 8, wherein said support member is mounted adjacent said second leg.

10. The rear pillar structure of claim 8, wherein said first leg is substantially U-shaped in cross section including an open end adjacent the side wall.

11. The rear pillar structure of claim 8, wherein said support member is substantially U-shaped in cross section.

12. The rear pillar structure of claim 8, wherein said support member includes a reinforcing portion adjacent a rear wall of said first leg and upper and lower portions extending from said rear wall of said first leg to a front wall of said first leg.

13. The rear pillar structure of claim 8, wherein said support member is positioned between said rear side and said front side of said first leg.

14. The rear pillar structure of claim 8, wherein said second leg is substantially U-shaped in cross section including an open end which receives said cross member.

15. The rear pillar structure of claim 8, wherein said second leg is fixedly attached to said first leg.

16. A rear pillar structure for connection to a vehicle frame for supporting a tailgate of a load-carrying bed, comprising:
   a pillar including a first leg, a second leg approximately normal relative to said first leg, and a support member disposed in said first leg;
   said first leg extending along a rear edge of a side wall of the load carrying bed and fixedly attached to the side wall and one of a pair of frame rails of the vehicle frame;
   said second leg extending along a cross member disposed between the pair of frame rails and fixedly attached to said first leg and the cross member; and,
   said support member fixedly attached to and within said first leg for supporting a hinge of the tailgate.

17. The rear pillar structure of claim 16, wherein said first leg is substantially U-shaped in cross section including an open end adjacent the side wall.

18. The rear pillar structure of claim 16, wherein said support member includes a reinforcing portion adjacent a rear wall of said first leg and upper and lower portions extending from said rear wall of said first leg to a front wall of said first leg.

19. The rear pillar structure of claim 16, wherein said second leg is substantially U-shaped in cross section including an open end in which said cross member is positioned.

20. A rear pillar assembly of a vehicle frame, comprising:
   a box-shaped pillar member fixedly secured to an adjacent frame rail of the vehicle frame and a cross member extending from said adjacent frame rail to an opposed frame rail of the vehicle frame, said pillar member extending upward from said adjacent frame rail; and,
   a support bracket received in said pillar member to reinforce a portion of said pillar member used to support a pivotally mounted tailgate.

21. The rear pillar assembly of claim 20, including a cross member bracket reinforcing the connection between said pillar and said cross member.

22. The rear pillar assembly of claim 21, wherein said pillar member forms a first leg extending along a side wall of the vehicle frame defining a bed and said cross member bracket forms a second leg extending along said cross member.

23. The rear pillar assembly of claim 22 wherein said support bracket includes a reinforcing portion adjacent a rear wall of said first leg and upper and lower portions extending from said rear wall of said first leg to a front wall of said first leg.

24. The rear pillar structure of claim 23, wherein said support bracket is positioned between said rear wall and said front wall of said first leg.

* * * * *